(12) United States Patent
Yu et al.

(10) Patent No.: US 11,861,054 B2
(45) Date of Patent: Jan. 2, 2024

(54) MOVING ROBOT AND METHOD FOR CONTROLLING THE SAME

(71) Applicant: LG ELECTRONICS INC., Seoul (KR)

(72) Inventors: Kyungman Yu, Seoul (KR); Jongil Park, Seoul (KR); Seungin Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 539 days.

(21) Appl. No.: 16/709,421

(22) Filed: Dec. 10, 2019

(65) Prior Publication Data

US 2020/0193071 A1 Jun. 18, 2020

(30) Foreign Application Priority Data

Dec. 12, 2018 (KR) .................. 10-2018-0160277

(51) Int. Cl.
| | | |
|---|---|---|
| G06F 21/88 | (2013.01) | |
| A01D 34/00 | (2006.01) | |
| H04L 9/32 | (2006.01) | |
| H04W 4/029 | (2018.01) | |
| G05D 1/02 | (2020.01) | |
| A01D 101/00 | (2006.01) | |

(52) U.S. Cl.
CPC .......... *G06F 21/88* (2013.01); *A01D 34/008* (2013.01); *G05D 1/0219* (2013.01); *H04L 9/3226* (2013.01); *H04W 4/029* (2018.02); *A01D 2101/00* (2013.01); *G05D 2201/0208* (2013.01)

(58) Field of Classification Search
None
See application file for complete search history.

(56) References Cited

U.S. PATENT DOCUMENTS

| | | | | |
|---|---|---|---|---|
| 6,338,013 | B1* | 1/2002 | Ruffner | B60L 3/106 |
| | | | | 180/443 |
| 2012/0265391 | A1* | 10/2012 | Letsky | G05D 1/0221 |
| | | | | 701/25 |
| 2013/0117867 | A1* | 5/2013 | Fung | G06F 21/88 |
| | | | | 726/35 |
| 2017/0249794 | A1* | 8/2017 | Davis | G07C 9/00309 |
| 2018/0055312 | A1* | 3/2018 | Jung | G06T 19/006 |
| 2018/0129199 | A1 | 5/2018 | Gustavsson et al. | |

(Continued)

FOREIGN PATENT DOCUMENTS

| | | |
|---|---|---|
| JP | H09330484 | 12/1997 |
| JP | 2001-236585 | 8/2001 |
| JP | 2008-152659 | 7/2008 |

(Continued)

OTHER PUBLICATIONS

International Search Report in corresponding International Patent Application No. PCT/KR2019/017451, dated Mar. 25, 2020.

*Primary Examiner* — Jeff A Burke
*Assistant Examiner* — Arslan Azhar
(74) *Attorney, Agent, or Firm* — Birch, Stewart, Kolasch & Birch, LLP

(57) ABSTRACT

A robot and a method for controlling the robot detects a theft of the robot based on posture information for a main body of the robot and position information of the robot. Operation of the robot is restricted depending on whether a theft of the robot is detected.

9 Claims, 8 Drawing Sheets

(56) References Cited

U.S. PATENT DOCUMENTS

2018/0213718 A1    8/2018   Honjo

FOREIGN PATENT DOCUMENTS

| KR | 10-2013-0015458 | 2/2013 | |
|---|---|---|---|
| KR | 10-2018-0079799 | 7/2018 | |
| WO | WO 2018/194504 A1 | 10/2018 | |
| WO | WO-2018194504 A1 * | 10/2018 | ........... A01D 34/008 |

\* cited by examiner

MOVING ROBOT AND METHOD FOR CONTROLLING THE SAME

CROSS-REFERENCE TO RELATED APPLICATIONS

This application claims the benefit of priority of Korean Application No. 10-2018-0160277, filed on Dec. 12, 2018, the contents of which is hereby incorporated by reference herein in its entirety.

TECHNICAL FIELD

The present disclosure relates to a moving robot that autonomously travels in a travel area and a method for controlling the moving robot.

BACKGROUND ART

Generally, a moving robot is a device that automatically performs a predetermined operation while traveling by itself in a predetermined area without a user's operation. The moving robot senses obstacles located in the area and performs its operation by moving close to or away from such obstacles.

Such a lawn mower robot may include a cleaning robot that carries out cleaning while traveling in an area, as well as a lawn mower robot that mows the grass on a bottom of the area. Generally, lawn mower devices include a riding-type device that moves according to a user's operation to cut a lawn or perform weeding when the user rides on the device, and a work-behind type or hand type device that is manually pushed or pulled by the user to move and cut a lawn. Such a lawn mower is moved by a direct control of the user to mow the lawn, which causes user's inconvenience in that the device is operated only directly by the user. Accordingly, research has been conducted on a moving robot-type mower device including elements that cut a lawn.

Such a moving robot for lawn mowing (lawn mower) operates outdoors rather than indoors, and thus the moving robot for lawn mowing moves in a wider area compared to a moving robot traveling in an indoor area. In the case of indoors, a surface of the floor is monotonous (or flat), and factors such as terrain and objects affecting traveling of a moving robot are limited. On the other hand, as for outdoors, since it is an open space, there are many factors affecting traveling of a moving robot, and the traveling of the moving robot is greatly affected by the terrain. The moving robot traveling in such an outdoor environment is exposed to risks such as theft, damage, and the like, and thus it is vulnerable when it comes to reliability and security. In addition, the moving robot can be an easy target for theft as it is pricey, and be easily stolen or damaged by a stranger intruding a travel area as it is exposed to the outdoor environment.

Meanwhile, U.S. Patent Laid-Open Publication No. 2018/0213718A1 (Published on Aug. 2, 2018) (hereinafter referred to as "related art document") discloses a moving robot in which a door lock designed to prevent an entry of a charging station, and the like is installed to monitor a moving robot by an infrared sensor or detector, and a door is opened only for a registered robot. This moving robot disclosed in the related art document is limited to a moving robot that travels in an indoor environment, and thus it is not suitable for a moving robot for lawn mowing that travels in an outdoor environment. In addition, an additional or separate support structure for sensing a moving robot is required, and factors and constraints regarding the outdoor environment are not taken into consideration, and thus a security countermeasure applicable to the outdoor environment is not provided.

In other words, in the related art moving robot, a security technology suitable for an open outdoor environment is not provided. In addition, in the field of moving robot technology, in general, a method for detecting theft, taking a proper follow-up measure after identifying the theft, and the like have not been provided, thereby making it difficult to prevent moving robot theft.

DISCLOSURE

Technical Problem

Therefore, an aspect of the present disclosure is to obviate the above-mentioned problems and other drawbacks.

More particularly, an aspect of the present disclosure is to provide a moving robot that can easily and accurately detect a situation of theft occurrence without a separate sensing element, and a method for controlling the moving robot.

Another aspect of the present disclosure is to provide a moving robot capable of taking a follow-up measure responding to a theft occurrence in an effective and efficient manner and tracking a theft (or stolen) path, and a method for controlling the moving robot.

Still another aspect of the present disclosure is to provide a moving robot capable of detecting a theft occurrence accurately and taking a countermeasure against the theft occurrence in an effective and efficient manner, so as to prevent risks such as theft and damage from occurring, and a method for controlling the moving robot.

Technical Solution

Embodiments disclosed herein provide a moving robot that may detect a theft occurrence of the moving robot based on conditions (or criteria) of a situation of theft occurrence, and control driving of the moving robot depending on a result of detection, and a method for controlling the moving robot.

In detail, when a mode is set to an anti-theft mode, theft occurrence may be detected based on posture information and position information of the moving robot, and the moving robot may be controlled such that functions of the moving robot are limited when the theft occurrence of the moving robot is detected.

That is, in the moving robot and the method for controlling the moving robot according to the present disclosure, the theft occurrence may be detected based on the posture information and the position information of the moving robot, so that driving of the moving robot is restricted depending on the result of detection, thereby preventing the moving robot from being stolen.

Accordingly, in the moving robot and the method for controlling the moving robot according to the present disclosure, the theft occurrence of the moving robot may be detected, and driving of the moving robot may be restricted accordingly.

The technical features herein may be implemented as a control element for a moving robot, a method for controlling a moving robot, a method for determining and detecting moving robot theft, and a method for preventing moving robot theft, and the like. This specification provides embodiments of the moving robot and the method for controlling the moving robot having the above-described technical features.

In order to achieve the aspects and other advantages of the present disclosure, there is provided a moving robot including a main body provided with a handle, a driving unit moving the main body, a sensing unit configured to sense at least one of state information of the main body, a communication unit communicating with a communication target element of the moving robot, an output unit displaying a control screen of the moving robot, and a controller determining position information of the main body based on at least one of a result of sensing by the sensing unit and a result of communication by the communication unit, and controlling the driving unit such that the main body travels in a travel area. The controller, when an anti-theft mode designed to prevent the moving robot from being stolen is set, may detect a theft occurrence of the moving robot based on the result of sensing and the position information, and control driving of at least one of the driving unit, the communication unit, or the output unit to restrict operation of the moving robot depending on a result of detection.

In order to achieve the aspects and other advantages of the present disclosure, there is also provided a method for controlling a moving robot including a main body provided with a handle, a driving unit moving the main body, a sensing unit configured to sense at least one of state information of the main body, a communication unit communicating with a communication target element of the moving robot, an output unit displaying a control screen of the moving robot, and a controller determining position information of the main body based on at least one of a result of sensing by the sensing unit and a result of communication by the communication unit, and controlling the driving unit such that the main body travels in a travel area, the method may include detecting a theft occurrence of the moving robot based on the result of sensing and the position information, displaying an input screen on the output unit for requesting an input of a preset usage code, and controlling driving of the driving unit and the output unit depending on the usage code entered through the input screen.

Advantageous Effects

In a moving robot and a method for controlling the moving robot according to the present disclosure, a theft occurrence is detected based on conditions of a moving robot theft occurrence situation, thereby detecting the moving robot theft occurrence easily and accurately.

In addition, in the moving robot and the method for controlling the moving robot according to the present disclosure, a follow-up measure responding to a situation of theft occurrence can be taken in an effective and efficient manner and a stolen (or theft) path can be easily tracked by restricting operation and manipulation of the moving robot, and controlling driving of the moving robot to be limited enough to keep transmitting information of the theft occurrence.

Further, in the moving robot and the method for controlling the moving robot according to the present disclosure, theft of the moving robot, exposed to risks such as theft and damage, can be prevented in an effective and efficient manner.

Thus, the moving robot and the method for controlling the moving robot according to the present disclosure can not only obviate limitations of the related art, but also improve usability, reliability, stability, and security in the technical field of moving robots for lawn mowing.

MODES FOR CARRYING OUT THE PREFERRED EMBODIMENTS

Figure 1:
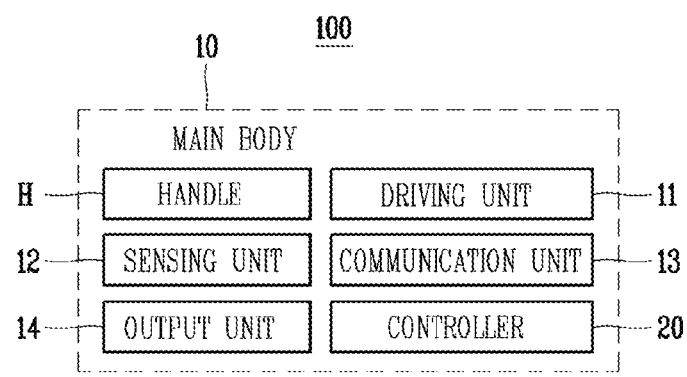
FIG. 1 is a configuration diagram illustrating one embodiment of a moving robot according to the present disclosure.

Hereinafter, embodiments of a moving robot and a method for controlling the moving robot according the present disclosure will be described in detail with reference to the accompanying drawings, and the same reference numerals are used to designate the same/like components and redundant description thereof will be omitted.

In describing technologies disclosed in the present disclosure, if a detailed explanation for a related known function or construction is considered to unnecessarily divert the idea of the technologies in the present disclosure, such explanation has been omitted but would be understood by those skilled in the art. It should be noted that the attached drawings are provided to facilitate understanding of the technical idea disclosed in this specification, and should not be construed as limiting the technical idea by the attached drawings.

Hereinafter, an embodiment of a moving robot (hereinafter referred to as "robot") according to the present disclosure will be described.

The robot may refer to a robot capable of autonomous traveling, a lawn-mowing moving robot, a lawn mowing robot, a lawn mowing device, or a moving robot for lawn mowing.

As illustrated in FIG. 1, the robot 100 includes a main body 10 provided with a handle H, a driving unit 11 moving the main body 10, a sensing unit 12 sensing more than one state (or status) information of the main body 10, a communication unit 13 communicating with a communication target element of the robot 100, an output unit 14 displaying a control screen of the robot 100, and a controller 20 determining position (or location) information of the main body 10 based on at least one of a result of sensing by the sensing unit 12 and a result of communication by the communication unit 13, and controlling the driving unit 11 such that the main body 10 travels within a travel area.

The controller 20 may control the driving unit 11, the sensing unit 12, the communication unit 13, and the output unit 14. The controller 20 may control driving of the driving unit 11, the sensing unit 12, the communication unit 13, and the output unit 14, so that the driving unit 11, the sensing unit 12, the communication unit 13, and the output unit 14 perform their respective functions. That is, the controller 20 may control driving of the driving unit 11, the sensing unit 12, the communication unit 13, and the output unit 14 to control operation of the robot 100.

The controller 20 may determine current position information of the main body 10 based on at least one of the result of sensing and the result of communication to control the driving unit 11 such that the main body 10 travels in the travel area 1000, and to display status information regarding operation and control of the robot 100 on the control screen via the output unit 14.

In the robot 100 including the main body 10, the driving unit 11, the sensing unit 12, the communication unit 13, the output unit 14, and the controller 20, when an anti-theft mode designed to prevent the robot 100 from being stolen is set, the controller 20 detects a theft occurrence of the robot 100 based on the sensing result and the position information, and controls driving of at least one of the driving unit 11, the communication unit 13, or the output unit 14 to restrict operation of the robot 100.

That is, when the anti-theft mode is set, the operation of the robot 100 is restricted by controlling the driving of at least one of the driving unit 11, the communication unit 13, and the output unit 14.

Figure 2:
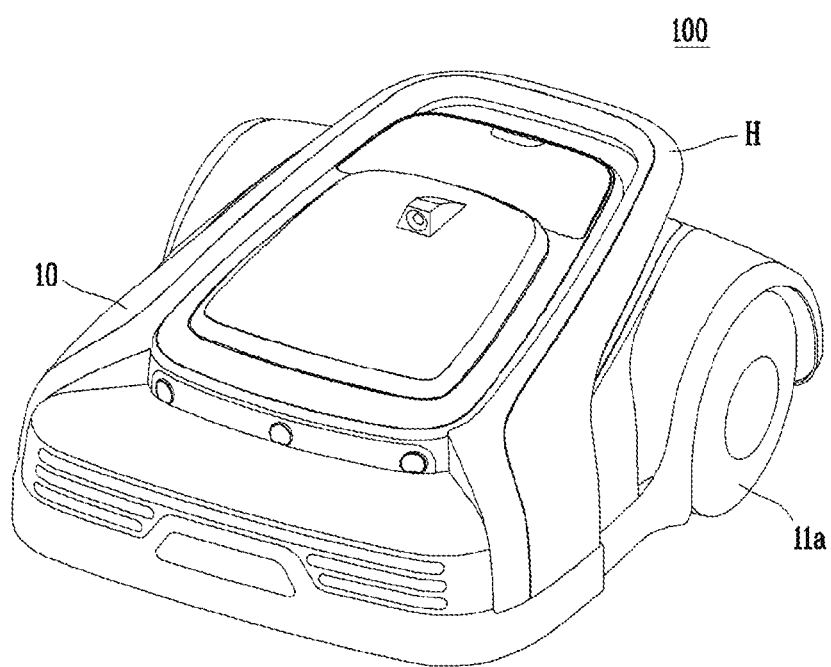
FIG. 2 is a configuration diagram illustrating a moving robot according to the present disclosure.
Figure 3:
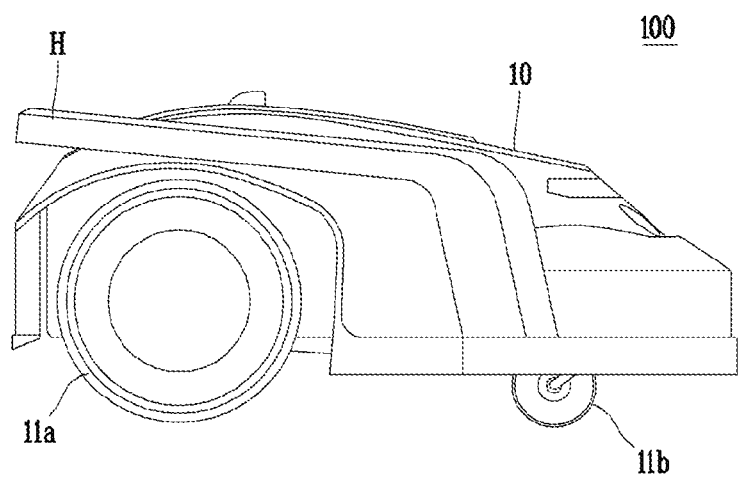
FIG. 3 is a configuration diagram illustrating a moving robot according to the present disclosure.

As shown in FIGS. 2 and 3, the robot 100 may be an autonomous traveling robot including the main body 10 configured to be movable so as to cut a lawn. The main body 10 forms an outer shape (or appearance) of the robot 100 and is provided with the handle H. The main body 10 may include one or more elements performing operation such as traveling of the robot 100 and lawn cutting. The main body 10 includes the driving unit 11 that may move the main body 10 in a desired direction and rotate the main body 10. The driving unit 11 may include a plurality of rotatable driving wheels. Each of the driving wheels may individually rotate so that the main body 10 rotates in a desired direction. In detail, the driving unit 11 may include at least one main driving wheel 11a and an auxiliary wheel 11b. For example, the main body 10 may include two main driving wheels 11a, and the two main driving wheels may be installed on a rear lower surface of the main body 10.

Figure 4:
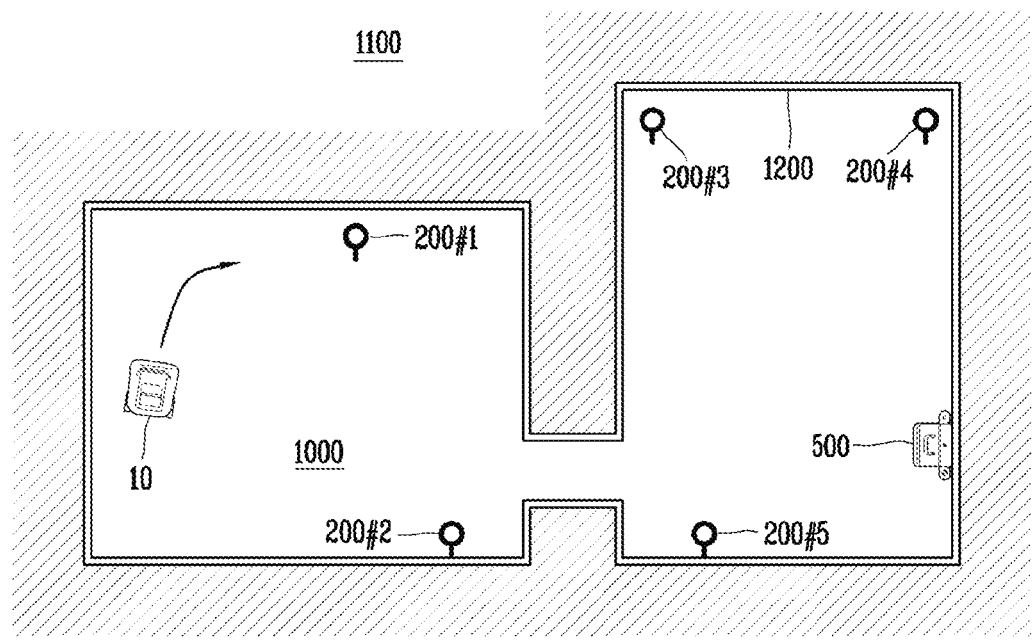
FIG. 4 is a conceptual view illustrating one embodiment of a travel area of the moving robot according to the present disclosure.

The robot 100 may travel by itself within a travel area 1000 shown in FIG. 4. The robot 100 may perform particular operation during traveling. Here, the particular operation may be cutting a lawn in the travel area 1000. The travel area 1000 is a target area in which the robot 100 is to travel and operate. A predetermined outside and outdoor area may be provided as the travel area 1000. For example, a garden, a yard, or the like in which the robot 100 is to cut a lawn may be provided as the travel area 1000. A charging apparatus 500 for charging the robot 100 with driving power may be installed in the travel area 1000. The robot 100 may be charged with driving power by docking with the charging apparatus 500 installed in the travel area 1000.

The travel area 1000 may be provided as a boundary area 1200 that is predetermined, as shown in FIG. 4. The boundary area 1200 corresponds to a boundary line between the travel area 1000 and an outside area 1100, and the robot 100 may travel within the boundary area 1200 not to deviate from the outside area 1100. In this case, the boundary area 1200 may be formed to have a closed curved shape or a closed-loop shape. Also, in this case, the boundary area 1200 may be defined by a wire formed to have a shape of a closed curve or a closed loop. The wire 1200 may be installed in an arbitrary area. The robot 100 may travel in the travel area 1000 having a closed curved shape formed by the installed wire 1200.

As shown in FIG. 4, a transmission device 200 may be provided in plurality in the travel area 1000. The transmission device 200 is a signal generation element configured to transmit a signal to determine position (or location) information of the robot 100. The transmission devices 200 may be installed in the travel area 1000 in a distributed manner. The robot 100 may receive signals transmitted from the transmission devices 200 to determine a current position of the robot 100 based on a result of receiving the signals, or to determine position information regarding the travel area 1000. In this case, a receiver of the robot 100 may receive the transmitted signals. The transmission devices 200 may be provided in a periphery of the boundary area 1200 of the travel area 1000. Here, the robot 100 may determine the boundary area 1200 based on installed positions of the transmission devices 200 in the periphery of the boundary area 1200.

Figure 6:
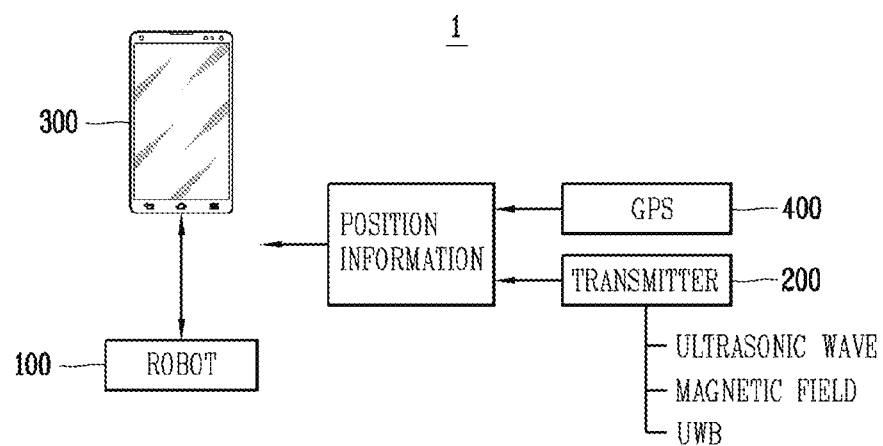
FIG. 6 is a conceptual diagram illustrating a signal flow between devices to determine a position of the moving robot according to the present disclosure.

The robot 100 may operate according to a driving mechanism (or principle) as shown in FIG. 4, and a signal may flow between devices for determining a position as shown in FIG. 6.

Figure 5:
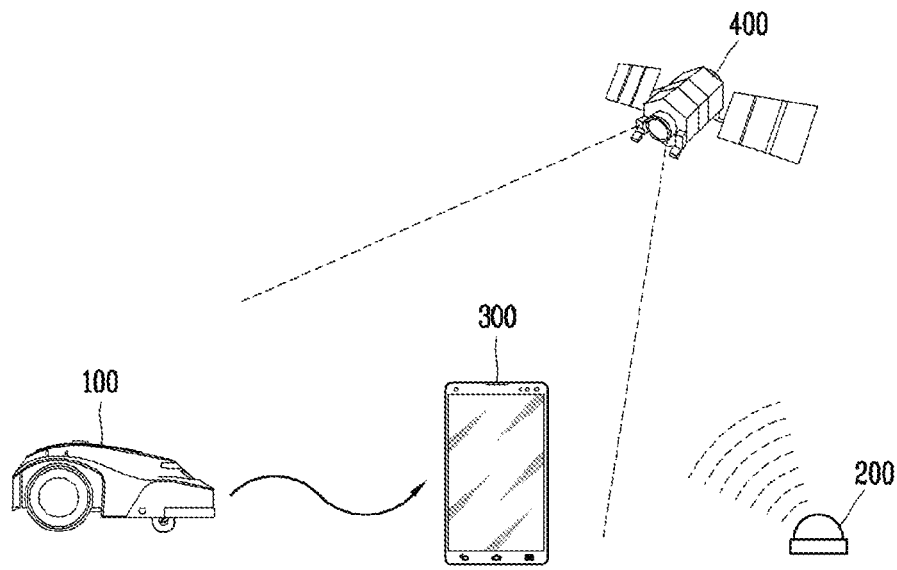
FIG. 5 is a conceptual view illustrating a traveling principle of the moving robot according to the present disclosure.

As shown in FIG. 5, the robot 100 may communicate with the terminal 300 moving in a predetermined area, and travel by following a position of the terminal 300 based on data received from the terminal 300. The robot 100 may set a virtual boundary in a predetermined area based on position information received from the terminal 300 or collected while the robot 100 is traveling by following the terminal 300, and set an internal area formed by the virtual boundary as the travel area 1000. When the boundary area 1200 and the travel area 1000 are set, the robot 100 may travel in the travel area 1000 not to deviate from the boundary area 1200. According to cases, the terminal 300 may set the boundary area 1200 and transmit the boundary area 1200 to the robot 100. When the terminal 300 changes or expands an area, the terminal 300 may transmit changed information to the robot 100 so that the robot 100 may travel in a new area. Also, the terminal 300 may display data received from the robot 100 on a screen to monitor operation of the robot 100.

The robot 100 or the terminal 300 may determine a current position by receiving position information. The robot 100 and the terminal 300 may determine a current position based on a signal for position information transmitted from the transmission device 200 in the travel area 1000 or a global positioning system (GPS) signal obtained using a GPS satellite 400. The robot 100 and the terminal 300 may determine a current position by receiving signals transmitted from three transmission devices 200 and comparing the signals with each other. That is, three or more transmission devices 200 may be provided in the travel area 1000.

The robot 100 sets one certain point in the travel area 1000 as a reference position, and then calculates a position while the robot 100 is moving as a coordinate. For example, an initial starting position, that is, a position of the charging apparatus 500 may be set as a reference position. Alternatively, a position of one of the plurality of transmission devices 200 may be set as a reference position to calculate a coordinate in the travel area 1000. The robot 100 may set an initial position of the robot 100 as a reference position in each operation, and then determine a position of the robot 100 while the robot 100 is traveling. With respect to the reference position, the robot 100 may calculate a traveling distance based on rotation times and a rotational speed of a driving wheel, a rotation direction of a main body, etc. to thereby determine a current position in the travel area 1000. Even when the robot 100 determines a position of the robot 100 using the GPS satellite 400, the robot 100 may determine the position using a certain point as a reference position.

As shown in FIG. 6, the robot 100 may determine a current position based on position information transmitted from the transmission device 200 or the GPS satellite 400. The position information may be transmitted in the form of a GPS signal, an ultrasound signal, an infrared signal, an electromagnetic signal, or an ultra-wideband (UWB) signal. A signal transmitted from the transmission device 200 may preferably be a UWB signal. Accordingly, the robot 100 may receive the UWB signal transmitted from the transmission device 200, and determine the current position based on the UWB signal.

Figure 7:
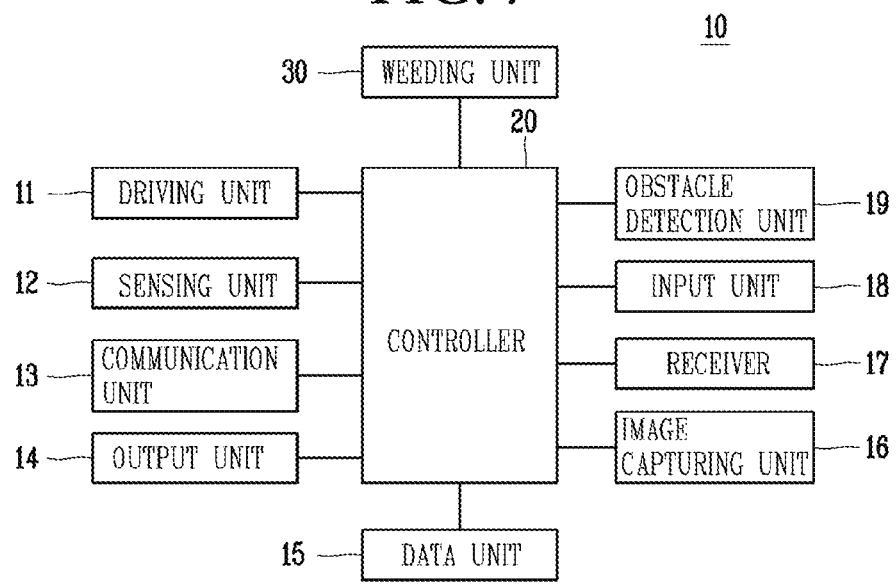
FIG. 7 is a detailed configuration diagram of the moving robot according to the present disclosure.

The robot 100 operating as described above may include the main body 10, the driving unit 11, the sensing unit 12, the communication unit 13, the output unit 14, and the controller 20 as shown in FIG. 7. When the anti-theft mode is set, a robot 100 theft occurrence may be detected and operation of the robot 100 may be limited according to a result of detection. The robot 100 may further include at least one selected from a data unit 15, an image capturing unit 16, a receiver 17, an audio unit 18, an obstacle detection unit 19, and a weeding unit 30. Also, the robot 100 may further include a power supply unit (not shown) for supplying power to each of the driving unit 11, the sensing unit 12, the communication unit 13, the output unit 14, the data unit 15, the image capturing unit 16, and the receiver 17, the audio unit 18, the obstacle detection unit 19, the controller 20, and the weeding unit 30.

The driving unit 11 is a driving wheel included in a lower part of the main body 10, and may be rotationally driven to move the main body 10. That is, the driving unit 11 may be driven such that the main body 10 travels in the travel area 1000. The driving unit 11 may include at least one driving motor to move the main body 10 so that the robot 100 travels. For example, the driving unit 11 may include a left wheel driving motor for rotating a left wheel and a right wheel driving motor for rotating a right wheel.

The driving unit 11 may transmit information about a result of driving to the controller 20, and receive a control command for operation from the controller 20. The driving unit 11 may operate according to the control command received from the controller 20. That is, the driving unit 11 may be controlled by the controller 20.

The sensing unit 12 may include one or more sensors that sense at least one state (or status) of the main body 10. The sensing unit 12 may include at least one sensor that senses a posture and an operation state (or status) of the main body 10. The sensing unit 12 may include at least one selected from an inclination sensor that detects movement of the main body 10 and a speed sensor that detects a driving speed of the driving unit 11. The sensing unit 12 may further include a grip sensor that detects a grip (or gripped) state of the handle H. The inclination sensor may be a sensor that senses posture information of the main body 10. When the main body 10 is inclined forward, backward, leftward or rightward, the inclination sensor may sense the posture information of the main body 10 by calculating an inclined direction and an inclination angle. A tilt sensor, an acceleration sensor, or the like may be used as the inclination sensor. In the case of the acceleration sensor, any of a gyro type sensor, an inertial type sensor, and a silicon semiconductor type sensor may be used. In addition, various sensors or devices capable of detecting movement of the main body 10 may be used. The speed sensor may be a sensor for sensing a driving speed of a driving wheel provided in the driving unit 11. When the driving wheel rotates, the speed sensor may sense the driving speed by detecting rotation of the driving wheel.

The sensing unit 12 may transmit information of a result of sensing to the controller 20, and receive a control command for operation from the controller 20. The sensing unit 12 may operate according to a control command received from the controller 20. That is, the sensing unit 12 may be controlled by the controller 20.

The communication unit 13 may communicate with at least one communication target element that is to communicate with the robot 100. The communication unit 13 may communicate with the transmission device 200 and the terminal 200 using a wireless communication method. The communication unit 13 may be connected to a predetermined network so as to communicate with an external server or the terminal 300 that controls the robot 100. When the communication unit 13 communicates with the terminal 300, the communication unit 13 may transmit a generated map to the terminal 300, receive a command from the terminal 300, and transmit data regarding an operation state (or status) of the robot 100 to the terminal 300. The communication unit 13 may include a communication module such as wireless fidelity (Wi-Fi), wireless broadband (WiBro), or the like, as well as a short-range wireless communication module such as Zigbee, Bluetooth, or the like, to transmit and receive data.

The communication unit 13 may transmit information about a result of the communication to the controller 20, and receive a control command for operation from the controller 20. The communication unit 13 may operate according to the control command received from the controller 20. That is, the communication unit 13 may be controlled by the controller 20.

The output unit 14 may include at least one input element such as a button, a switch, a touch pad, etc., and an output element such as a display unit, and the like to receive a user's command and output an operation state of the robot 100. For example, a command for executing the anti-theft mode may be input and a status for execution of the anti-theft mode may be output via the display unit.

The output unit 14 may display a state of the robot 100 through the display unit, and display a control screen on which manipulation or an input is applied for controlling the robot 100. The control screen may mean a user interface screen on which a driving state of the robot 100 is displayed and output, and a command for operating the robot 100 is input from a user. The control screen may be displayed on the display unit under the control of the controller 20, and a display and an input command on the control screen may be controlled by the controller 20.

The output unit 14 may transmit information about an operation state to the controller 20 and receive a control command for operation from the controller 20. The output unit 14 may operate according to a control command received from the controller 20. That is, the output unit 14 may be controlled by the controller 20.

The data unit 15 is a storage element that stores data readable by a microprocessor, and may include a hard disk drive (HDD), a solid state disk (SSD), a silicon disk drive (SDD), a read only memory (ROM) a random access memory (RAM), CD-ROM, a magnetic tape, a floppy disk, or an optical data storage device. In the data unit 15, a received signal may be stored, reference data to determine an obstacle may be stored, and obstacle information regarding a detected obstacle may be stored. In the data unit 15, control data that controls operation of the robot 100, data according to an operation mode of the robot 100, position information collected, and information about the travel area 1000 and the boundary area 1200 may be stored.

The image capturing unit 16 may be a camera capturing an image of a periphery of the main body 10 to generate image information of the travel area 1000 of the main body 10. The image capturing unit 16 may capture an image of a forward direction of the main body 10 to detect an obstacle around the main body 10 and in the travel area 1000. The image capturing unit 16 may be a digital camera, which may include an image sensor (not shown) and an image processing unit (not shown). The image sensor is a device that converts an optical image into an electrical signal. The image sensor includes a chip in which a plurality of photodiodes is integrated. A pixel may be an example of a photodiode. Electric charges are accumulated in the respective pixels by an image, which is formed on the chip by light that has passed through a lens, and the electric charges accumulated in the pixels are converted to an electrical signal (for example, a voltage). A charge-coupled device (CCD) sensor and a complementary metal oxide semiconductor (CMOS) sensor are well known as image sensors. In addition, the image capturing unit 16 may include a Digital Signal Processor (DSP) for the image processing unit to process a captured image so as to generate image information.

The image capturing unit 16 may capture an image of a periphery of the main body 10 from a position where it is installed, and generate image information according to a result of image capturing. The image capturing unit 16 may be provided at an upper portion of a rear side of the main body 10. The image capturing unit 16 may capture an image of a traveling direction of the main body 10. That is, the image capturing unit 16 may capture an image of a forward direction of the main body 10 to travel. The image capturing unit 16 may capture an image around the main body 10 in real time to generate the image information.

The image capturing unit 16 may transmit information about a result of image capturing to the controller 20, and receive a control command for operation from the controller 20. The image capturing unit 16 may operate according to the control command received from the controller 20. That is, the image capturing unit 16 may be controlled by the controller 20.

The receiver 17 may include a plurality of signal sensor modules that transmits and receives the position information. The receiver 17 may include a position sensor module that receives the signals transmitted from the transmission device 200. The position sensor module may transmit a signal to the transmission device 200. When the transmission device 200 transmits a signal using a method selected from an ultrasound method, a UWB method, and an infrared method, the receiver 17 may include a sensor module that transmits and receives an ultrasound signal, a UWB signal, or an infrared signal, in correspondence with this. The receiver 17 may include a UWB sensor. As a reference, UWB radio technology refers to technology using a very wide frequency range of several GHz or more in baseband instead of using a radio frequency (RF) carrier. UWB wireless technology uses very narrow pulses of several nanoseconds or several picoseconds. Since pulses emitted from such a UWB sensor are several nanoseconds or several picoseconds long, the pulses have good penetrability. Thus, even when there are obstacles in a periphery of the UWB sensor, the receiver 17 may receive very short pulses emitted by other UWB sensors.

When the robot 100 travels by following the terminal 300, the terminal 300 and the robot 100 include the UWB sensor, respectively, thereby transmitting or receiving a UWB signal with each other through the UWB sensor. The terminal 300 may transmit the UWB signal to the robot 100 through the UWB sensor included in the terminal 300. The robot 100 may determine a position of the terminal 300 based on the UWB signal received through the UWB sensor, allowing the robot 100 to move by following the terminal 300. In this case, the terminal 300 operates as a transmitting side and the robot 100 operates as a receiving side. When the transmission device 200 includes the UWB sensor and transmits a signal, the robot 100 or the terminal 300 may receive the signal transmitted from the transmission device 200 through the UWB sensor included in the robot 100 or the terminal 300. At this time, a signaling method performed by the transmission device 200 may be identical to or different from signaling methods performed by the robot 100 and the terminal 300.

The receiver 17 may include a plurality of UWB sensors. When two UWB sensors are included in the receiver 17, for example, provided on left and right sides of the main body 10, respectively, the two USB sensors may receive signals, respectively, and compare a plurality of received signals with each other to thereby calculate an accurate position. For example, according to a position of the robot 100, the transmission device 200, or the terminal 300, when a distance measured by a left sensor is different from a distance measured by a right sensor, a relative position between the robot 100 and the transmission device 200 or the terminal 300, and a direction of the robot 100 may be determined based on the measured distances.

The receiver 17 may further include a GPS module for transmitting and receiving a GPS signal to and from the GPS satellite 400.

The receiver 17 may transmit a result of receiving a signal to the controller 20, and receive a control command for operation from the controller 20. The receiver 17 may operate according to the control command received from the controller 20. That is, the receiver 17 may be controlled by the controller 20.

The audio unit (or module) 18 may include an output element such as a speaker to output an operation state of the robot 100 in the form of an audio output. The audio unit 18 may output an alarm when an event occurs while the robot 100 is operating. For example, when the power is run out, an impact or shock is applied to the robot 100, or an accident occurs in the travel area 1000, the audio unit 18 may output an alarm audio output so that the corresponding information is provided to the user.

The audio unit 18 may transmit information regarding an operation state to the controller 20 and receive a control command for operation from the controller 20. The audio unit 18 may operate according to a control command received from the controller 20. That is, the audio unit 18 may be controlled by the controller 20.

The obstacle detection unit 19 includes a plurality of sensors to detect obstacles located in a traveling direction. The obstacle detection unit 19 may detect an obstacle located in a forward direction of the main body 10, that is, in a traveling direction of the main body 10 using at least one selected from a laser sensor, an ultrasonic sensor, an infrared sensor, and a three-dimensional (3D) sensor. The obstacle detection unit 19 may further include a cliff detection sensor installed on a rear surface of the main body 10 to detect a cliff.

The obstacle detection unit 19 may transmit information regarding a result of detection to the controller 20, and receive a control command for operation from the controller 20. The obstacle detection unit 19 may operate according to the control command received from the controller 20. That is, the obstacle detection unit 19 may be controlled by the controller 20.

The weeding unit 30 cuts grass on the bottom while traveling. The weeding unit 30 is provided with a brush or blade for cutting a lawn, so as to cut the grass on the ground in a rotating manner.

The weeding unit 30 may transmit information about a result of operation to the controller 20 and receive a control command for operation from the controller 20. The weeding unit 30 may operate according to the control command received from the controller 20. That is, the weeding unit 30 may be controlled by the controller 20.

The controller 20 may include a central processing unit to control overall operation of the robot 100. The controller 20 may determine the position information via the main body 10, the driving unit 11, the sensing unit 12, the communication unit 13, and the output unit 14 to control the main body 10 such that the main body 10 travels within the travel area 1000, and control functions and operation of the robot 100 to be performed via the data unit 15, the image capturing unit 16, the receiver 17, the audio unit 18, the obstacle detection unit 19, and the weeding unit 30.

The controller 20 may control input and output of data, and control the driving unit 11 so that the main body 10 travels according to settings. The controller 20 may independently control operation of the left wheel driving motor and the right wheel driving motor by controlling the driving unit 11 to thereby control the main body 10 to travel rotationally or in a straight line.

The controller 20 may set the boundary area 1200 of the travel area 1000 based on position information received from the terminal 300 or position information determined based on the signal received from the transmission device 200. The controller 20 may also set the boundary area 1200 of the travel area 1000 based on position information that is collected by the controller 20 during traveling. The controller 20 may set a certain area of a region formed by the set boundary area 1200 as the travel area 1000. The controller 20 may set the boundary area 1200 in a closed loop form by connecting discontinuous position information in a line or a curve, and set an inner area within the boundary area 1200 as the travel area 1000. When the travel area 1000 and the border area 1200 corresponding thereto are set, the controller 20 may control traveling of the main body 10 so that the main body 10 travels in the travel area 1000 without deviating from the set boundary area 1200. The controller 20 may determine a current position based on received position information and control the driving unit 11 so that the determined current position is located in the travel area 1000 to thereby control traveling of the main body 10.

In addition, according to obstacle information input by at least one of the image capturing unit 16, the obstacle detection unit 19, and the controller 20 may control traveling of the main body 10 to avoid obstacles and travel. In this case, the controller 20 may modify the travel area 1000 by reflecting the obstacle information to pre-stored area information regarding the travel area 1000.

In the robot 100 having the configuration as shown in FIG. 7, when the anti-theft mode is set, the controller 20 may detect a robot 100 theft occurrence, and control driving at least one of the driving unit 11, the communication unit 13, or the output unit 14 to restrict operation of the robot 100 depending on a result of detection.

Figure 8:
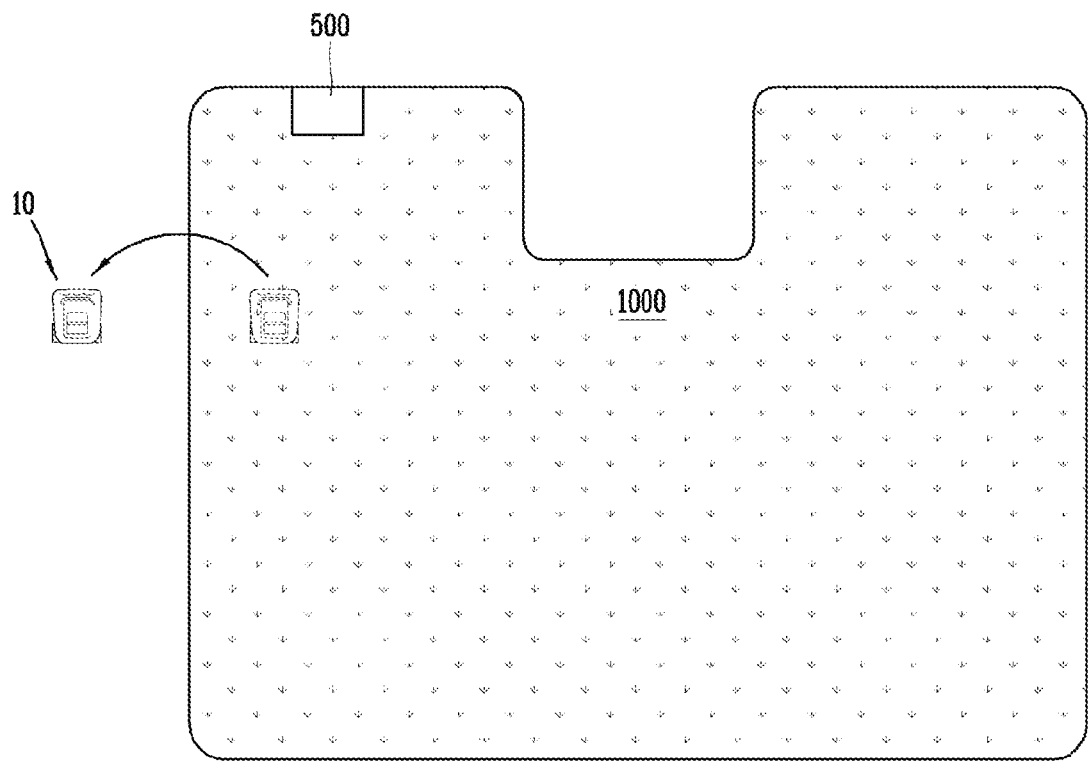
FIG. 8 is an exemplary view illustrating an example of theft occurrence and theft occurrence detection according to an embodiment of the present disclosure.

The robot 100 may perform set operation while traveling in the travel area 1000. For example, the robot 100 may cut a lawn on the bottom of the travel area 1000 while traveling in the travel area 1000 as shown in FIG. 8.

In the robot 100, the main body 10 may travel according to driving of the driving unit 11. The main body 10 may travel as the driving unit 11 is driven to move the main body 10.

In the robot 100, the driving unit 11 may be driven by the controller 20. Under the control of the controller 20, the driving unit 11 may be driven by receiving driving power from the power supply unit. The driving unit 11 may move the main body 10 by driving the driving wheels. The driving unit may move the main body 10 by operating the driving wheels, so that the main body 10 travels.

In the robot 100, the sensing unit 12 may be driven by the controller 20. The sensing unit 12 may be driven by receiving driving power from the power supply unit under the control of the controller 20. The sensing unit 12 may include one or more sensors to sense one or more states of the main body 10. The sensing unit 12 may include at least one of a contact sensor that senses a grip (or gripped) state of the handle H and an inclination sensor that senses posture information of the main body 10. That is, in the sensing unit 12, the grip state of the handle H may be sensed by the contact sensor, and an inclination (or tilt) of the main body 10 may be sensed by the inclination sensor. Accordingly, a result of the sensing may be at least one of the sensing the grip state of the handle H and the sensing of the inclination of the main body 10. The sensing unit 12 may include both the contact sensor and the inclination sensor.

In the robot 100, the communication unit 13 may be driven by the controller 20. The communication unit 13 may be driven by receiving driving power from the power supply unit under the control of the controller 20. The communication unit 13 may communicate with the communication target element for transmitting and receiving information to and from the communication target element. Here, the communication target element may be the terminal 300. The communication target element may further include the transmission device 200. The communication unit 13 may receive information for determining the position information from the communication target element, and transmit the position information to the communication target element. The communication unit 13 may communicate with the communication target element in real time.

In the robot 100, the output unit 14 may be driven by the controller 20. The output unit 14 may be driven by receiving driving power from the power supply unit under the control of the controller 20. The output unit 14 may display the control screen, so as to display information regarding operation and control state of the robot 100. For example, position information of the main body 10, a control interface for controlling operation of the robot 100, and the like may be displayed.

In the robot 100, the controller 20 may control each of the driving unit 11, the sensing unit 12, the communication unit 13, and the output unit 14. The controller 20 may control the driving unit 11, the sensing unit 12, the communication unit 13, and the output unit 14 individually (or separately) by controlling driving power supply. In more detail, the controller 20 may control the driving power of the driving unit 11, the sensing unit 12, the communication unit 13, and the output unit 14 supplied from the power supply unit to control driving of the driving unit 11, the sensing unit 12, the communication unit 13, and the output unit 14. Here, the driving control may mean controlling a function of the driving unit 11, the sensing unit 12, the communication unit 13, and the output unit 14, as well as controlling the driving itself. The controller 20 may determine position information of the main body 10 based on at least one of a result of sensing by the sensing unit 12 and a result of communication by the communication unit 13 to control the driving unit 11, so that the main body 10 is controlled to travel in the travel area 1000 based on the position information.

The controller 20 may control operation of the robot 100 according to a set operation mode. Here, the operation mode is a mode related to the operation of the robot 100, and may include, for example, a traveling mode, a monitoring mode, and the anti-theft mode. The controller 20 may control each of the driving unit 11, the sensing unit 12, the communication unit 13, and the output unit 14 according to a set operation mode. That is, the controller 20 may control operation of the robot 100 to perform the set mode by controlling the driving unit 11, the sensing unit 12, the communication unit 13, and the output unit 14, respectively.

When the anti-theft mode designed to prevent the robot 100 from being stolen is set, the controller 20 may detect a robot 100 theft occurrence based on the sensing result and the position information, and control at least one of the driving unit 11, the communication unit 13, or the output unit 14 to restrict operation of the robot 100 according to a detection result. That is, the anti-theft mode may be a mode for detecting robot 100 theft and limiting operation of the robot 100 when the robot 100 theft is occurred. Accordingly, in the anti-theft mode, the controller 20 may detect the robot 100 theft occurrence based on the sensing result and the location information, and restrict the operation of the robot 100 by controlling the driving of one or more of the driving unit 11, the communication unit 13, and the output unit 14 when the robot 100 theft is occurred.

An example how the controller 20 detects the robot 100 theft occurrence in the anti-theft mode will be described with reference to FIG. 8.

As illustrated in FIG. 8, when the main body 10 located in the travel area 1000 is not in the travel area 1000, the controller 20 may determine that robot 100 theft is occurred, and identify the robot 100 theft occurrence. That is, the controller 20 may detect the robot 100 theft when the robot 100 is moved to the outside of the travel area 1000 by an external force of a person who is not the owner of the robot 100.

The controller 20 may compare the sensing result with predetermined determination criteria (or reference) and the position information to determine whether the main body 10 is deviated from the travel area 1000, so as to detect the robot 100 theft occurrence. In more detail, the controller 20 may identify the robot 100 theft occurrence based on a result of comparing at least one of the results of sensing the main body 10 status with the determination criteria, and the position information of the current position of the main body 10. Here, the sensing results may be sensing a grip (or gripped) state of the handle H and an inclination of the main body 10. In addition, the determination criteria may be a reference for at least one of a grip state of the handle H and an inclination of the main body 10, for example, whether the handle H is gripped or whether the main body 10 is inclined more than a predetermined inclination. Accordingly, the controller 20 may detect the robot 100 theft occurrence based on a result of comparing a sensing result of the grip state of the handle H with the determination criteria and the location information, or based on a result of comparing a sensing result of the inclination of the main body 10 with the determination criteria and the location information.

Figure 9:
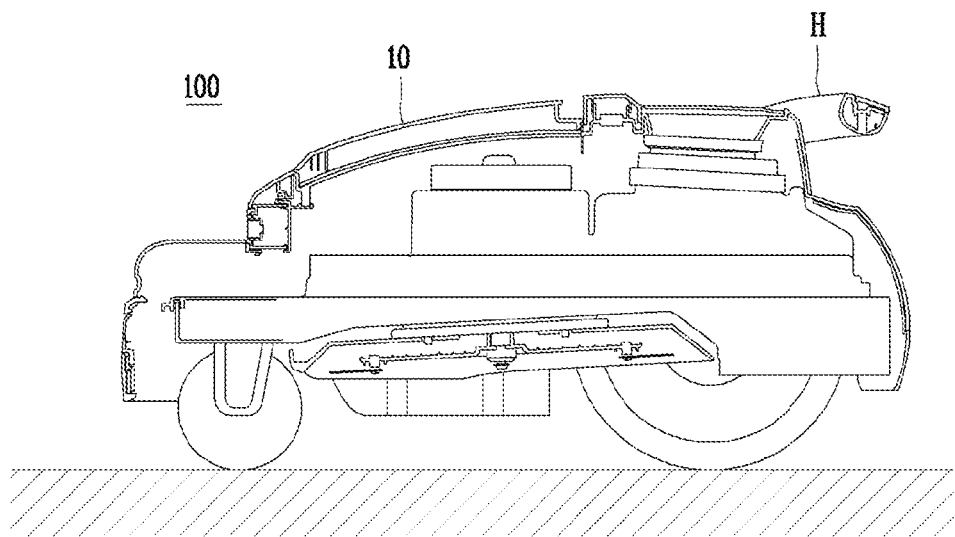
FIG. 9 is an exemplary view illustrating another example of theft occurrence and theft occurrence detection according to an embodiment of the present disclosure.
Figure 10:
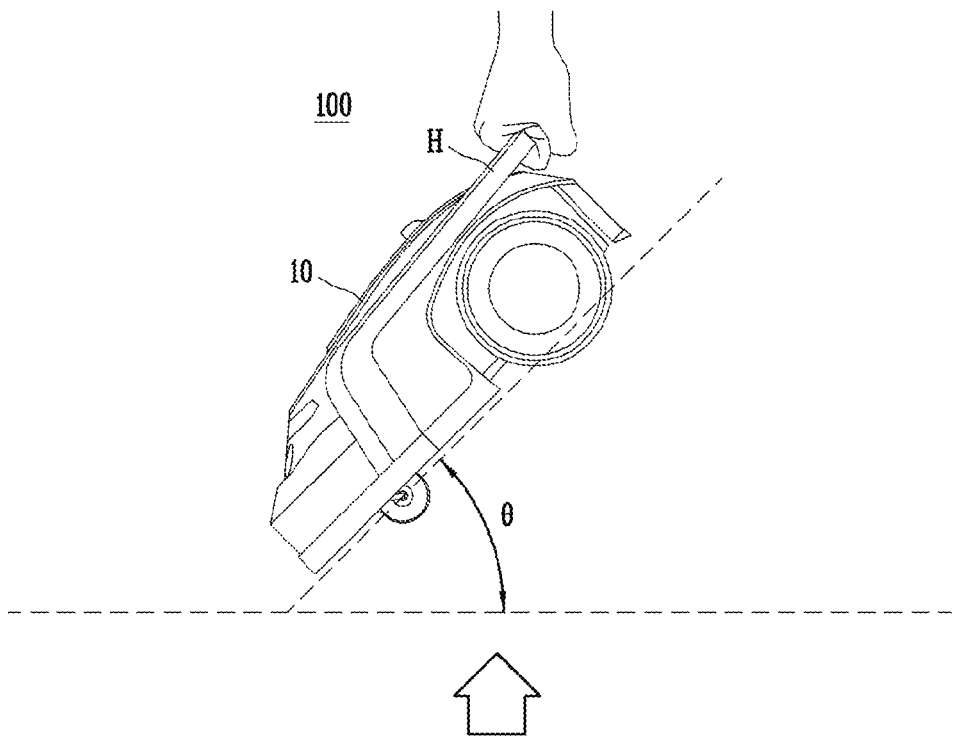
FIG. 10 is an exemplary view illustrating another example of theft occurrence and theft occurrence detection according to an embodiment of the present disclosure.

The controller 20 may detect the theft occurrence when the sensing result corresponds to the determination criteria, and the position information corresponds to the outside of the travel area 1000 (or non-travel area 1000). That is, when at least one of the sensing results, either the grip state of the handle H or the inclination of the main body 10, corresponds to the determination criteria, and when the position information corresponds to the outside of the travel area 1000, the controller 20 may detect the theft occurrence. For instance, the controller 20 may detect the theft occurrence when the handle H is gripped and the main body 10 is deviated from the travel area 1000. Referring to FIGS. 9 and 10, the theft occurrence may be detected when the handle H is gripped by the person who is not the owner of the robot 100, and the main body 10 is lifted from the ground as shown in FIG. 10 and is then moved to the outside the travel area 1000 as shown in FIG. 8. Alternatively, the controller may detect the theft occurrence when the main body 10 is tilted more than a predetermined inclination and the main body 10 is deviated from the travel area 1000. In detail, the robot 100 theft may be detected when the main body 10 in a state as shown in FIG. 9 is lifted from the ground more than a predetermined inclination 8 set for the predetermined determination criteria as shown in FIG. 10, and is then moved to the outside of the travel area 1000.

As such, when the sensing result corresponds to the determination criteria, and the position information corresponds to the outside of the travel area 1000, the controller 20 that senses the theft occurrence may detect a malfunction or an error in the sensing unit 12 when the sensing result corresponds to the determination criteria, but the position information falls within the travel area 1000. In other words, when the sensing result corresponds to the determination criteria, but the main body 10 is not deviated from the travel area 1000, the controller 20 determines that the sensing unit 12 is not working properly since the sensing result of the gripped state of the handle H or the inclination of the main body 10 by the sensing unit 12 is mistakenly or wrongly sensed.

Figure 11:
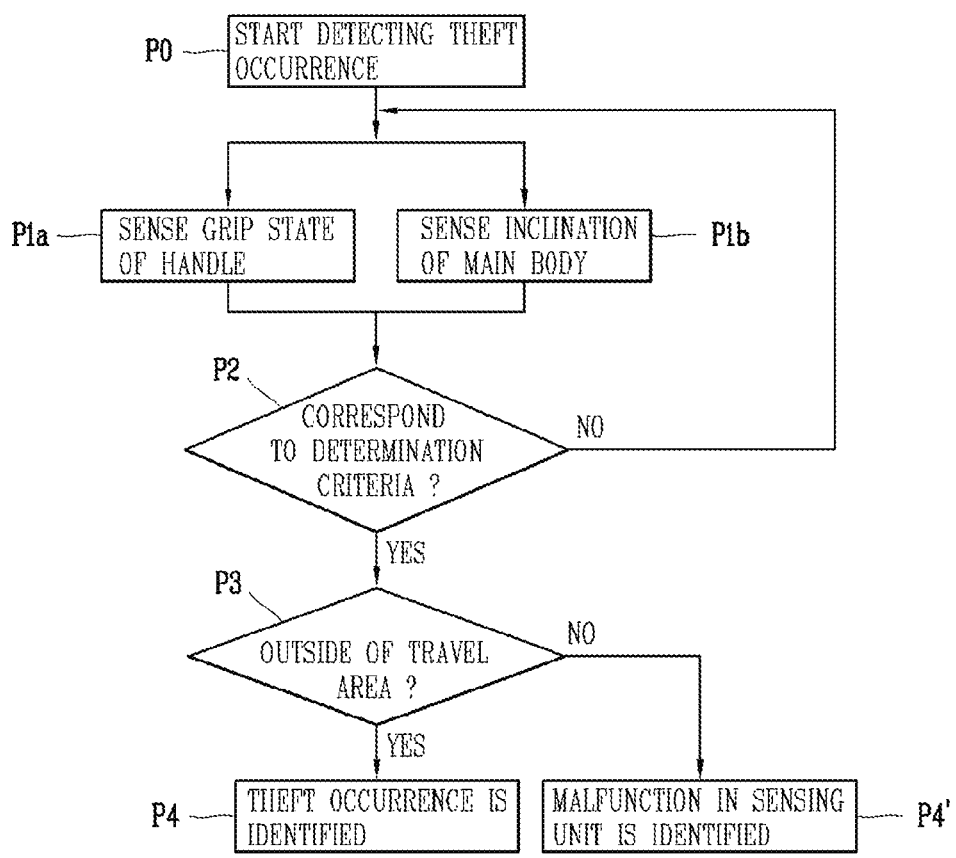
FIG. 11 is a flowchart illustrating a sequence for detecting theft occurrence in an anti-theft mode according to an embodiment of the present disclosure.

A process of detecting the theft occurrence by the controller 20 is illustrated in FIG. 11. When the anti-theft mode is set, the controller 20 may carry on detecting the theft occurrence (PO), and receive a result of sensing the main body 10 from the sensing unit 12. The sensing unit 12 may sense at least one of a grip(ped) state of the handle H (P1$a$) and an inclination of the main body 10 (P1$b$), and transmit the sensing result to the controller 20. Then the controller 20 compares the sensing result with the determination criteria to determine whether the grip state of the handle H (P1$a$) and/or the inclination of the main body 10 (P1$b$) corresponds to the determination criteria (P2). When at least one of the grip state of the handle H (P1$a$) and the inclination of the main body 10 (P1*b*) corresponds to the determination criteria, the controller 20 may determine whether the current position of the main body 10 is deviated from the travel area 1000 (P3) to detect the theft occurrence (P4 or P4'). When the main body 10 is deviated from the travel area 1000, the controller 20 may determine that the robot 100 theft is occurred, thereby detecting the theft occurrence (P4). That is, the controller 20 may detect the theft occurrence (P4) when at least one of the grip state of the handle H (P1*a*) and the inclination of the main body 10 (P1*b*) corresponds to the determination criteria, and the position information corresponds to the outside of the travel area 1000. When the main body 10 is not deviated from the travel area 1000, the controller 20 may detect a malfunction or an error in the sensing unit 12 (P4') and determines that the sensing unit 12 is not working properly. In more detail, the controller 20 may detect the error in the sensing unit 12 (P4') when at least one of the grip state of the handle H (P1*a*) and the inclination of the main body 10 (P1*b*) corresponds to the determination criteria, and the position information falls within the travel area 1000.

As such, when the controller 20 detects the theft occurrence, the controller 20 may control driving of the driving unit 11, the communication unit 13, and the output unit 14 to restrict operation of the robot 100, respectively. In other words, when the theft occurrence is detected, the controller 20 controls the driving of the driving unit 11, the communication unit 13, and the output unit 14, respectively, so as to prevent the robot 100 from being operated by a person who stole the robot 100.

When the controller 20 detects the theft occurrence, the controller 20 may cut off power supplied to the driving unit 11 and the output unit 14 to prevent driving of the driving unit 11 and the output unit 14. That is, when the theft occurrence is sensed, the controller 20 blocks driving of the driving unit 11 and the output unit 14, so as to prevent the robot 100 from being manipulated by the person who stole the robot 100 and being operated or used by the person who stole the robot 10. The controller 20 may cut off the driving power supplied to the driving unit 11 and the output unit 14 from the power supply unit, so as to prevent driving of the driving unit 11 and the output unit 14. In more detail, the controller 20 cuts off the driving power of the driving unit 11 moving the main body 10 and the output unit 14 displaying the control screen for controlling the robot 100 to prevent the robot 100 from being manipulated by the person who stole the robot 100 and from being used by the person who stole the robot 10 in the first place.

When the robot 100 theft is detected, the controller 20 may also transmit information about the theft occurrence to the communication target element via the communication unit 13. That is, when the robot 100 theft is detected, the controller 20 controls the communication unit 13 to transmit the information of the theft occurrence to the communication target element, allowing the corresponding theft information to be transmitted to the communication target element. In case the theft occurrence is detected, the controller 20 generates information regarding at least one of a location in which the theft occurred and time at which the theft occurred, and transmit the generated information to the communication target element via the communication unit 13.

When the theft occurrence is detected, the controller 20 may output a notification audio output via the audio unit 18. That is, the controller 20 may control the audio unit 18 to output the notification audio output to notify a situation of the robot 100 theft occurrence when the theft occurrence is detected. Here, the controller 20 may control the audio unit 18 to output the notification audio output according to a preset output reference.

Figure 13:
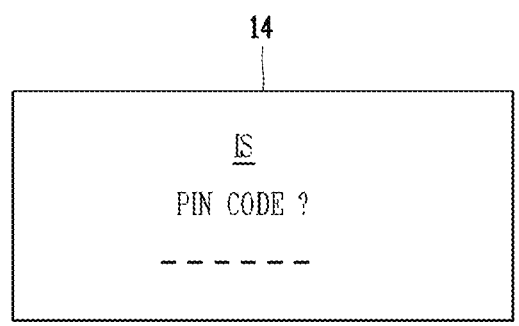
FIG. 13 is an exemplary view of an input screen according to an embodiment of the present disclosure.

The controller 20, after detecting the theft occurrence, may control the output unit 14 to display an input screen for requesting an input of a preset usage code. The power supplied to the driving unit 11 and the output unit 14 may be cut off depending on the code entered through the input screen. The usage code may mean a code for identifying an (authorized) user of the robot 100 in the event of the theft occurrence, the code may be a PIN CODE, a PASSWORD, or the like. The usage code may also mean a code for reactivating the robot 100, a user authentication code for the robot 100, and a code for unlocking the robot 100. The usage code may be set by the user of the robot 100 in advance. The usage code may be a combination of any numbers, letters, and symbols created by the user of the robot 100. The input screen IS for requesting an input of the usage code may be displayed on the output unit 14, allowing the user to input the usage code on the input screen IS as shown in FIG. 13. The input screen IS may be displayed on the output unit 14 after the theft occurrence is detected, and before the power supplied to the driving unit 11 and the output unit 14 is cut off. In other words, the input screen IS may be a screen for determining on whether a user (or person) is the authorized user of the robot 100 before restricting the operation of the robot 100.

The controller 20 may cut off the power supplied to the driving unit 11 and the output unit 14 according to a code input on the input screen IS. When the input code matches with the preset usage code, the controller 20 may determine that the theft occurrence is cleared or resolved, and maintain the power supplied to the driving unit 11 and the output unit 14. That is, when the usage code is correctly entered into the input screen IS, the controller 20 may determine that the robot 100 is operated by the authorized user and the theft occurrence is cleared as it is not stolen, thereby maintaining the power supplied to the driving unit 11 and the output unit 14. When the input code does not match with the preset usage code, the controller 20 may cut off the power supplied to the driving unit 11 and the output unit 14. In other words, when the usage code is incorrectly entered into the input screen, the controller 20 may determine that the robot 100 is manipulated by a person who stole the robot 100 (or an unauthorized user), so that the power supplied to the driving unit 11 and the output unit 14 may be cut off to limit the operation of the robot 100.

The controller 20 that displays the input screen IS for requesting an input of the usage code via the output unit 14 may display the input screen IS for a predetermined number of input times. The controller 20 may display the input screen IS by the number of input times until the usage code matching with the preset usage code is entered. In other words, the controller 20 may repeat a usage code input request by the number of input times until the usage code is entered correctly. Here, the number of input times may be set by the user, for example, five times. If the usage code is entered incorrectly more than the predetermined number of input times, the controller 20 may cut off the power supplied to the driving unit 11 and the output unit 14. In more detail, if the wrong usage code is entered more than the number of input times, the controller 20 determines that an unauthorized user attempts to manipulate the robot 100. Then the power supplied to the driving unit 11 and the output unit 14 may be cut off.

As such, the controller 20 that detects the theft occurrence and restricts the operation of the robot 100 may track the position information of the robot 100 until the theft occurrence is cleared after the theft occurrence is detected, and transmit the position information to the communication target element according to a predetermined transmission period via the communication unit 13. That is, the controller 20 may keep tracking of the position information of the robot 100 until the theft occurrence is cleared after detecting the theft occurrence, and transmit the position information to the communication target element via the communication unit 13. By doing so, a theft or stolen path can be tracked as the robot 100 keeps providing its position information in a stolen state.

Figure 12:
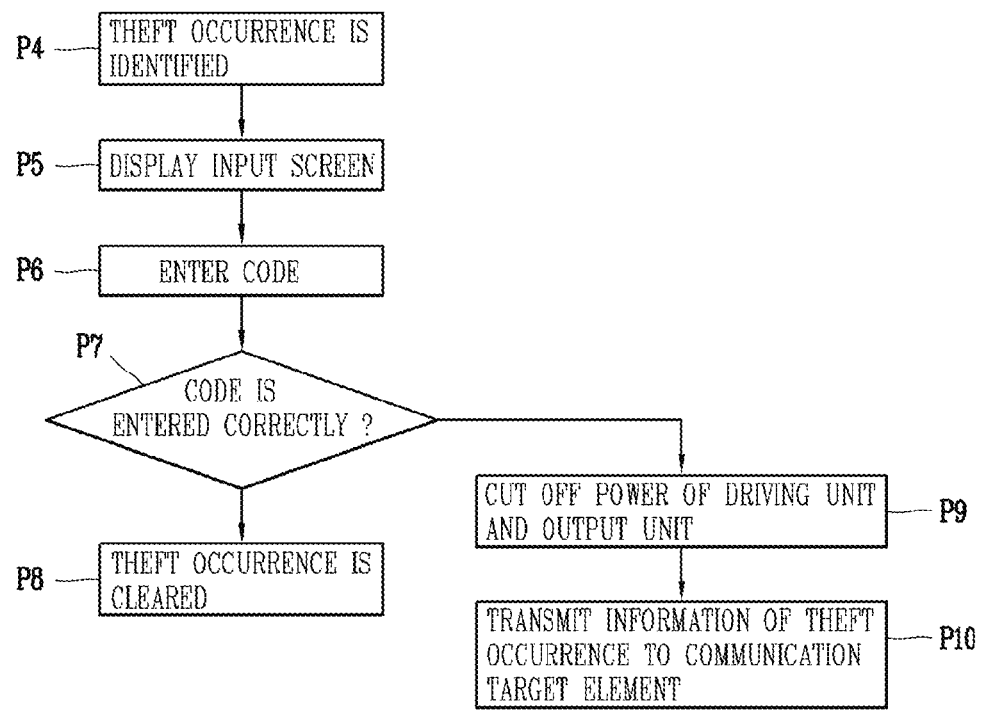
FIG. 12 is a flowchart illustrating a process of controlling operation in an anti-theft mode according to an embodiment of the present disclosure.

A process of restricting operation of the robot 100 by the controller 20 will be described with reference to FIG. 12. When the theft occurrence is detected (P4), the controller 20 controls the output unit 14 to display the input screen IS (P5). Here, the controller 20 may transmit information about the theft occurrence to the communication target element via the communication unit 13. In addition, the controller 20 may output a notification audio output for the theft occurrence via the audio unit 18. When a usage code is entered (P6) into the input screen IS, the controller 20 compares the usage code entered with the preset usage code (P7), and determines whether the robot 100 is stolen to remove the theft occurrence. After comparing the input usage code with the preset usage code (P7), the controller 20 may determine that the robot 100 theft occurrence is cleared (P8) when the input usage code matches with the preset usage code. In other words, when the usage code is entered correctly, the controller 20 may determine that the robot 100 is manipulated by the authorized user, and the theft occurrence is cleared (P8). Thus, the power supplied to the driving unit 11 and the output unit 14 may be maintained. When the input code does not match with the preset usage code, after comparing the input code with the usage code (P7), the controller 20 may cut off the power supplied to the driving unit 11 and the output unit 14 (P9). That is, when the usage code is entered incorrectly, the controller 20 may determine that an unauthorized user (person who stole the robot 100) attempts to manipulate the robot 100, then restricts the operation of the robot 100 by cutting off the power supplied to the driving unit 11 and the output unit 14 (P9). In this case, the controller 20 may generate information regarding at least one of a location in which the theft is occurred and time at which the theft is occurred, and transmit the generated information to the communication target element via the communication unit 13 (P10). In other words, when the usage code is entered incorrectly, the controller 20 determines that the robot 100 is manipulated by the unauthorized user, and transmit theft occurrence information to the communication target element via the communication unit 13 (P10), allowing a situation of the robot 100 theft occurrence to be transmitted to the communication target element. As such, when the theft incident is detected, the controller 20 may cut off the power supplied to the driving unit 11 and the output unit 14, and transmit information of the detected theft occurrence to the communication target element via the communication unit 13, thereby restricting the operation of the robot 100 and providing the information of the detected theft occurrence.

The robot 100 as described above may be implemented by using a method for controlling a moving robot (hereinafter referred to as "control method") to be described hereinafter.

The control method is a method for controlling the moving robot 100 as shown in FIGS. 1 to 3, which may be applied to the robot 100. It may also be applied to robots other than the robot 100.

The control method may be for controlling the robot 100 that includes the main body 10 provided with the handle H, the driving unit 11 moving the main body 10, the sensing unit 12 sensing at least one of state information of the main body 10, the communication unit 13 communicating with a communication target element of the robot 100, the output unit 14 displaying a control screen of the robot 100, and the controller 20 determining position information of the main body 100 based on at least one of a result of sensing by the sensing unit 12 and a result of communication by the communication unit 13 and controlling the driving unit 11 to control traveling of the main body 10, so that the main body 10 travels in the travel area 1000, which may be for a method of performing an anti-theft mode to prevent the robot 100 from being stolen.

The control method may be a control method performed by the controller 20.

Figure 14:
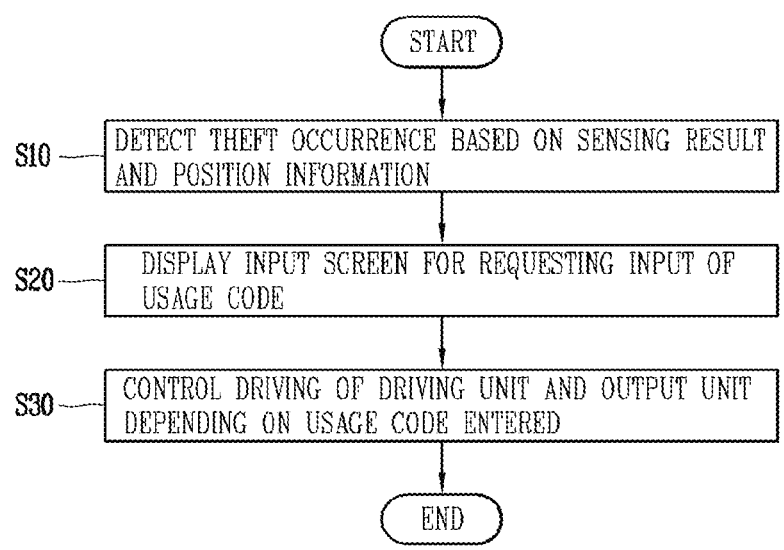
FIG. 14 is a flowchart illustrating a sequence for a method for controlling the moving robot according to the present disclosure.

As illustrated in FIG. 14, the control method may include detecting robot 100 theft occurrence based on the sensing result and the position information (S10), displaying an input screen on the output unit 14 for requesting an input of a preset usage code (S20), and controlling driving of the driving unit 11 and the output unit 14 depending on the used code the input screen (S30).

In other words, the robot 100 may perform the anti-theft mode in order from detecting (S10), displaying (S20), to controlling (S30).

The detecting step S10 may be a step in which the controller 20 detects the theft occurrence based on the sensing result and the position information after the anti-theft mode is set.

In the detecting step S10, the theft occurrence may be detected by comparing a result of sensing the grip (or gripped) state of the handle H and sensing an inclined (or tilted) state of the main body 10 with predetermined determination criteria to determine whether at least one of the grip state of the handle H and the inclined state of the main body 10 corresponds to the determination criteria.

In the detecting step S10, when at least one of the gripped state of the handle H and the inclined state of the main body 10 corresponds to the determination criteria, the current position of the main body 10 is determined on whether the current position of the main body 10 is deviated from the travel area 1000 to identify the theft occurrence according to a determination result.

In the detecting step S10, when at least one of the gripped state of the handle H and the inclined state of the main body 10 corresponds to the determination criteria and the position information corresponds to the outside of the travel area 1000, the robot 100 is determined to be stolen, allowing the theft occurrence to be identified.

In the detecting step S10, at least one of the gripped state of the handle H and the inclined state of the main body 10 corresponds to the determination criteria, and the position information corresponds to the travel area 1000, a malfunction or an error in the sensing unit 12 may be detected.

The displaying step S20 may be a step in which the controller 20 displays the input screen on the output unit 14 when the theft occurrence is detected at the detecting step S20.

In the displaying step S20, the input screen may be displayed on the output unit 14 for requesting an input of the usage code.

In the displaying step S20, the input screen may be displayed for a predetermined number of input times.

In the displaying step S20, the input screen may be displayed on the output unit 14 for the number of input times until the usage code is entered correctly.

In the displaying step S20, a request of the usage code input may be repeated by the number of input times until the usage code is entered correctly.

The controlling step S30 may be a step in which the controller 20 controls driving of the driving unit 11 and the output unit 14 according to the usage code entered into the input screen displayed at the displaying step S20.

In the controlling step S30, the input usage code is compared with the preset usage code to determine whether the robot 100 is stolen to cancel the theft occurrence.

In the controlling step S30, when the input code matches with the preset usage code, it is determined that the robot 100 is not stolen and the theft occurrence is cleared, and thus power supplied to the driving unit 11 and the output unit 14 may be maintained.

In the controlling step S30, when the code input does not match with the preset usage code, it is determined that an unauthorized person (a person who stole the robot 100) attempts to manipulate the robot 100, then the power supplied to the driving unit 11 and the output unit 14 may be cut off.

The control method that includes the detecting (S10), the displaying (S20), and the controlling (S30) can be implemented as computer-readable codes on a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. The computer-readable medium may also be implemented as a format of carrier wave (e.g., transmission via an Internet). In addition, the computer may also include the controller 20.

The above-described embodiments of the moving robot and the method for controlling the moving robot according to the present disclosure may be applied and implemented with respect to a control element for a moving robot, a moving robot system, a control system of a moving robot, a method for controlling a moving robot, a method for monitoring an area of the moving robot, a control method of monitoring an area of the moving robot, and the like. In particular, the above-described embodiments may be usefully applied and implemented with respect to a lawn mowing robot, a control system of a lawn mowing robot, a method for detecting theft of a lawn mowing robot, a method for preventing theft of a lawn mowing robot, etc. However, the technology disclosed in this specification is not limited thereto, and may be implemented in any moving robot, a control element for a moving robot, a moving robot system, a method for controlling a moving robot, or the like to which the technical idea of the above-described technology may be applied.

While the present disclosure has been particularly shown and described with reference to embodiments thereof, it will be understood that various changes in form and details may be made therein without departing from the spirit and scope of the present disclosure as defined by the following claims. Therefore, the scope of the present disclosure should not be limited by the described embodiments, but should be determined by the scope of the appended claims and equivalents thereof.

While the present disclosure has been particularly shown and described with reference to exemplary embodiments, described herein, and drawings, it may be understood by one of ordinary skill in the art that various changes and modifications thereof may be made. Therefore, the scope of the present disclosure should be defined by the following claims, and various changes equal or equivalent to the claims pertain to the category of the concept of the present disclosure.

What is claimed is:

1. A robot, comprising:
   a main body including a handle;
   a driving unit configured to move the main body;
   a sensing unit configured to sense at least one of state information of the main body, the sensing unit comprising:
      a contact sensor configured to sense a gripped state of the handle; and
      a tilt sensor configured to sense a posture of the main body;
   a communication unit configured to communicate with a communication target element of the robot;
   an output unit configured to display a control screen of the robot; and
   a controller configured to:
      determine position information of the main body based on at least one of a result of sensing by the sensing unit or a result of communication by the communication unit,
      control the driving unit such that the main body travels in a travel area, detect whether a theft of the robot has occurred when an anti-theft mode is set based on the state information of the main body sensed by the sensing unit and the position information, and
      control at least one of the driving unit, the communication unit, or the output unit to restrict operation of the robot when the theft of the robot is detected,
   wherein the tilt sensor senses a change in the posture of the main body,
   wherein the controller is configured to:
      determine whether the robot is outside of the travel area based on a comparison of predetermined criteria with state information of the main body sensed by the sensing unit, and the position information, and use the result of the comparison and the position information to detect the theft of the robot,
      determine that the theft has occurred when the state information of the main body sensed by the sensing unit corresponds to the predetermined criteria, and the position information is outside of the travel area, and
      control the output unit to display an input screen for requesting an input of a preset usage code after detecting the theft, and determine whether to control the driving unit, the communication unit, and the output unit to restrict operation of the robot depending on a usage code entered through the input screen,
   wherein the input screen is displayed on the output unit after a theft occurrence is detected and before power supplied to the driving unit and the output unit is cut off, and
   wherein the controller is configured to:
      determine that the robot is not stolen when the usage code entered through the input screen matches the preset usage code, and maintain the power supplied to the driving unit and the output unit when the robot is not stolen, and
      determine that the robot is stolen when the usage code is entered incorrectly a predetermined number of times, and cut off the power supplied to the driving unit and the output unit when the robot is stolen.

2. The robot of claim 1, wherein the predetermined criteria include at least one of the gripped state of the handle or an inclination of the main body.

3. The robot of claim 2, wherein the controller is configured to continue determining the position information of the main body after detecting the theft of the robot until determining that the robot has not been stolen, and transmit the position information to the communication target element via the communication unit according to a predetermined transmission period.

4. The robot of claim 1, wherein the controller is configured to determine that a malfunction in the sensing unit has occurred when the predetermined criteria corresponds to the state information of the main body sensed by the sensing unit and the position information falls within the travel area.

5. The robot of claim 1, wherein the controller is configured to cut off power supplied to the driving unit and the output unit to restrict the driving of the driving unit and the output unit, and transmit information regarding the theft to the communication target element via the communication unit, when the theft of the robot is detected.

6. The robot of claim 5, wherein the controller is configured to continue determining the position information of the main body after detecting the theft of the robot until determining that the robot has not been stolen, and transmit the position information to the communication target element via the communication unit according to a predetermined transmission period.

7. The robot of claim 1, wherein the controller is configured to continue determining the position information of the main body after detecting the theft of the robot until determining that the robot has not been stolen, and transmit the position information to the communication target element via the communication unit according to a predetermined transmission period.

8. A method for controlling a robot including a main body provided with a handle, a driving unit configured to move the main body, a sensing unit configured to sense at least one of state information of the main body, a communication unit communicating with a communication target element of the robot, an output unit displaying a control screen of the robot, and a controller configured to determine position information of the main body based on at least one of a result of sensing by the sensing unit or a result of communication by the communication unit, and control the driving unit such that the main body is controlled to travel in a travel area, the method comprising:
- detecting a theft occurrence of the robot based on the result of sensing by the sensing unit and the position information;
- displaying an input screen on the output unit for requesting an input of a preset usage code; and
- controlling driving of the driving unit and the output unit depending on the usage code entered through the input screen, wherein sensing by the sensing unit comprises sensing a gripped state of the handle and sensing a posture of the main body, wherein the input screen is displayed on the output unit after the theft occurrence is detected, and before the power supplied to the driving unit and the output unit is cut off, and wherein the method further comprises:
- determining that the robot is not stolen when the usage code entered through the input screen matches the preset usage code, and maintain the power supplied to the driving unit and the output unit;
- determining that the robot is stolen when the usage code entered through the input screen does not match with the preset usage code, and cut off the power supplied to the driving unit and the output unit; and
- cutting off the power supplied to the driving unit and the output unit when the usage code entered through the input screen is entered incorrectly a predetermined number of times.

9. The method of claim 8, further comprising continuing to determine the position information of the main body after detecting the theft of the robot until determining that the robot has not been stolen, and transmitting the position information to the communication target element via the communication unit according to a predetermined transmission period.

* * * * *